Aug. 28, 1962 H. H. FISHER, JR 3,051,240
MULTIPLE TESTING AND PRESSURING APPARATUS
Filed April 13, 1959 6 Sheets-Sheet 1
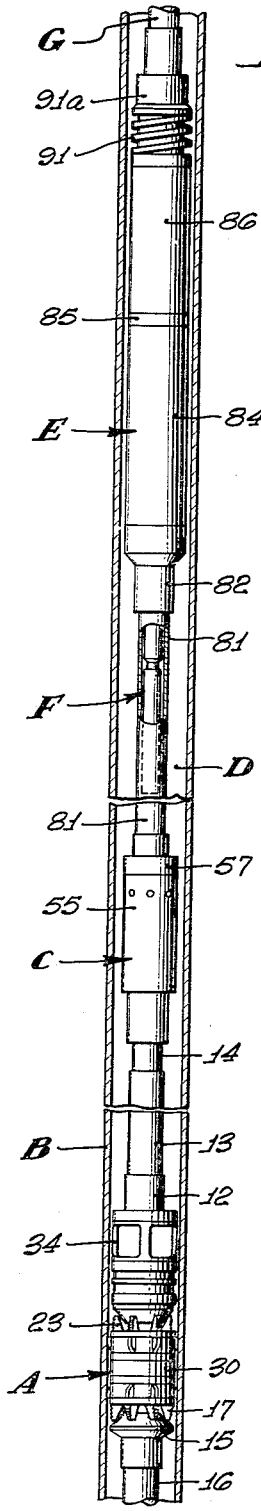
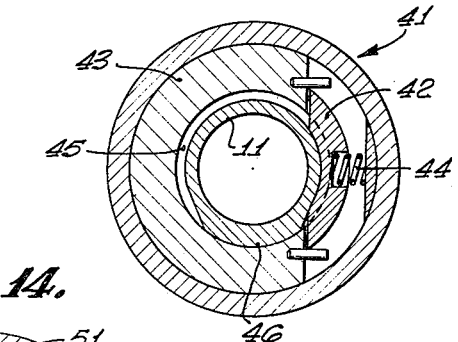
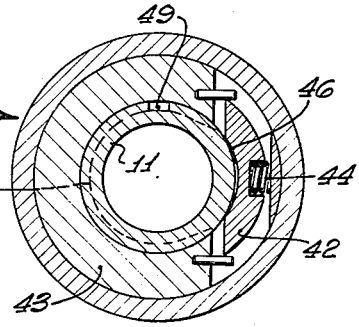
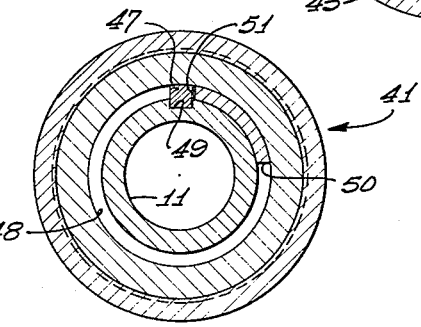
INVENTOR.
HIRAM H. FISHER, JR.
BY
Mellin and Hanscom
ATTORNEYS.

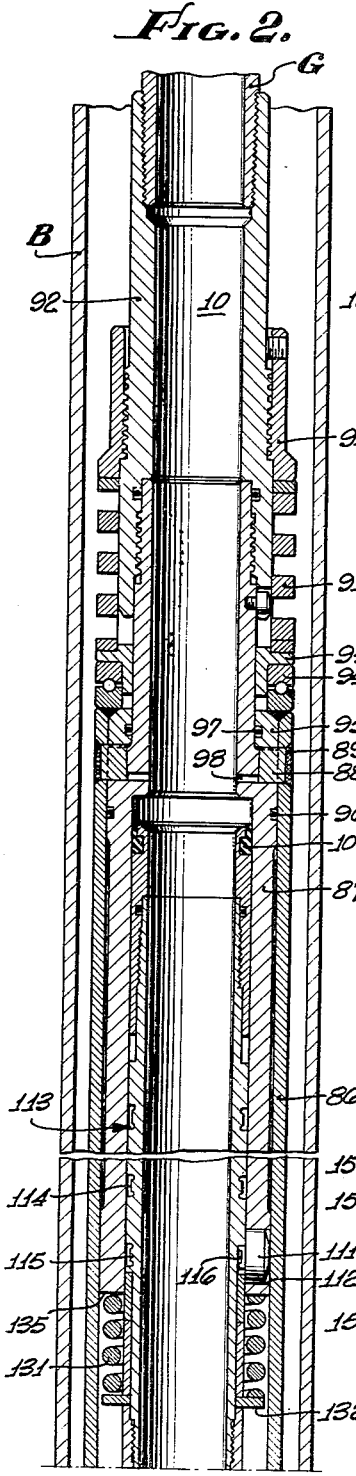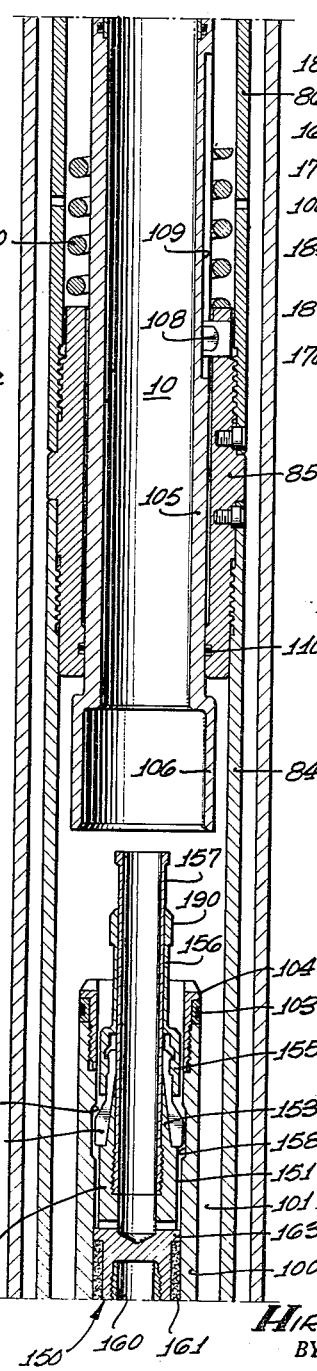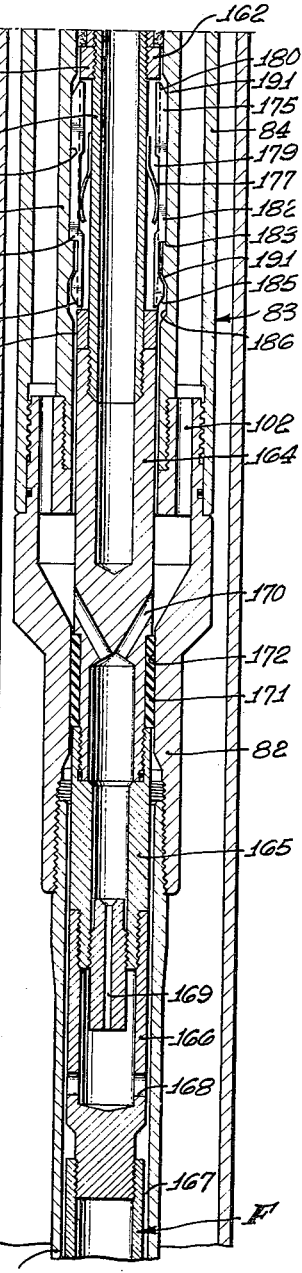

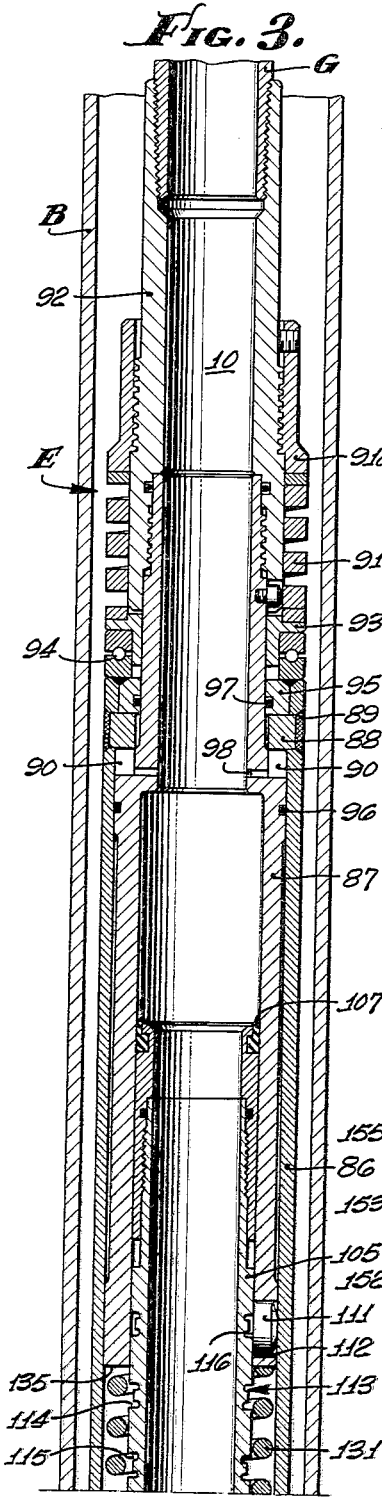

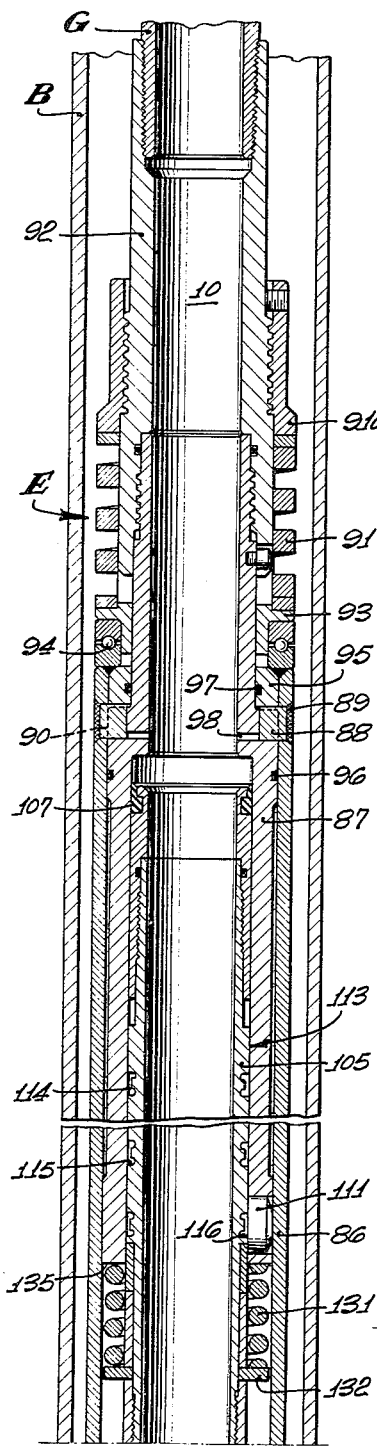
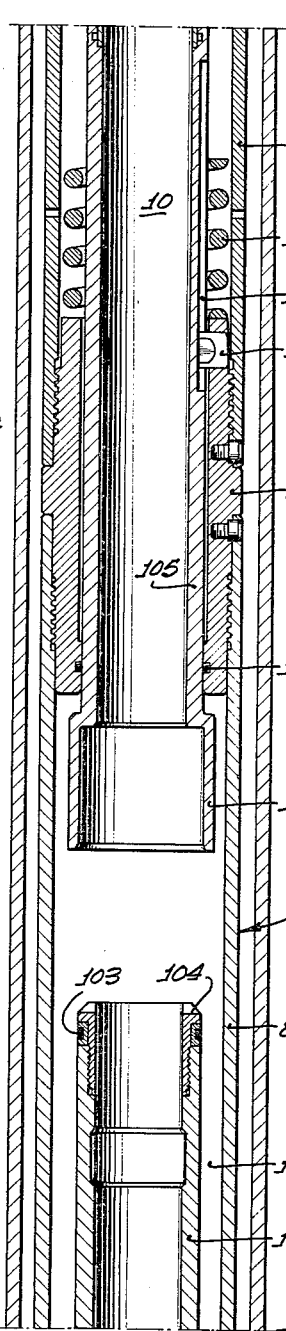
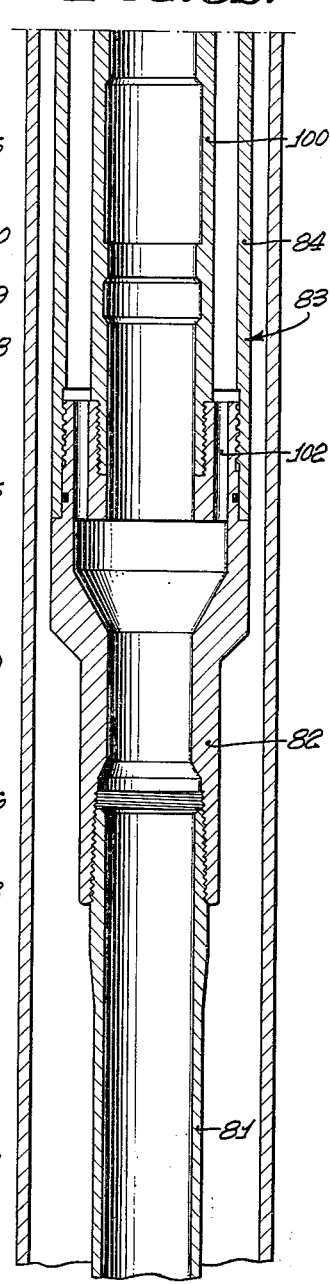

Aug. 28, 1962 H. H. FISHER, JR 3,051,240
MULTIPLE TESTING AND PRESSURING APPARATUS
Filed April 13, 1959 6 Sheets-Sheet 5

INVENTOR.
HIRAM H. FISHER, JR.
BY
Meelin and Hanscom
ATTORNEYS.

Aug. 28, 1962  H. H. FISHER, JR  3,051,240
MULTIPLE TESTING AND PRESSURING APPARATUS
Filed April 13, 1959   6 Sheets-Sheet 6
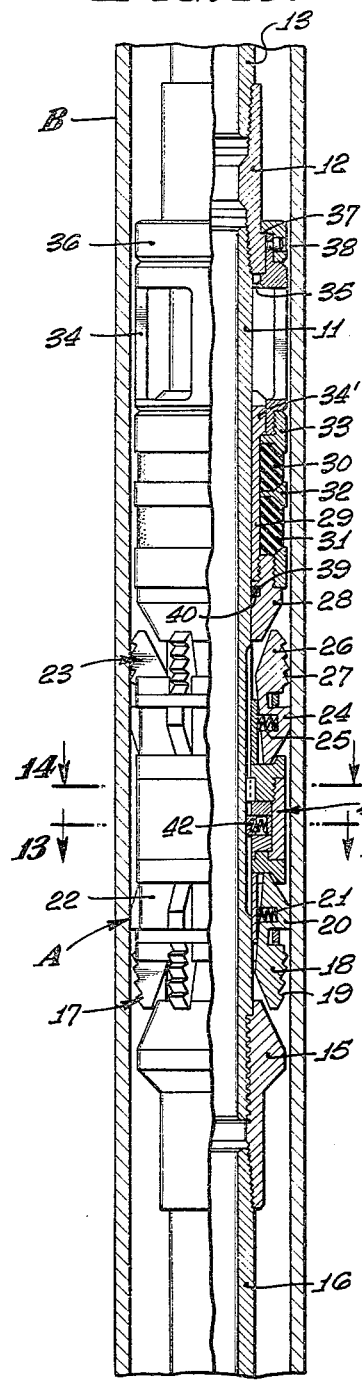
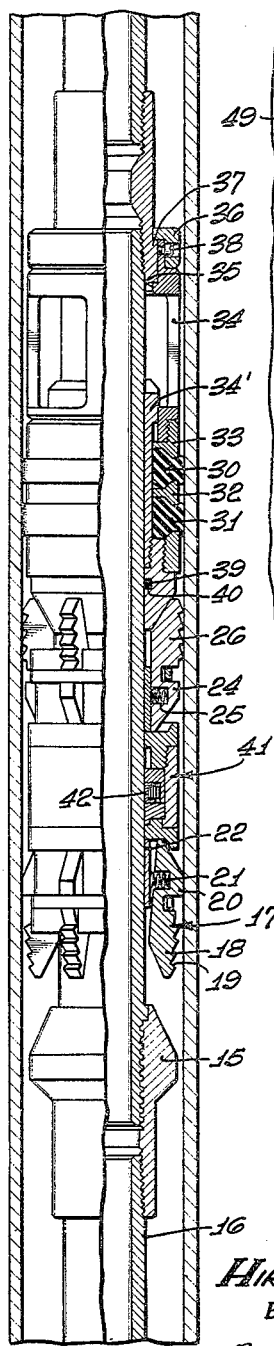
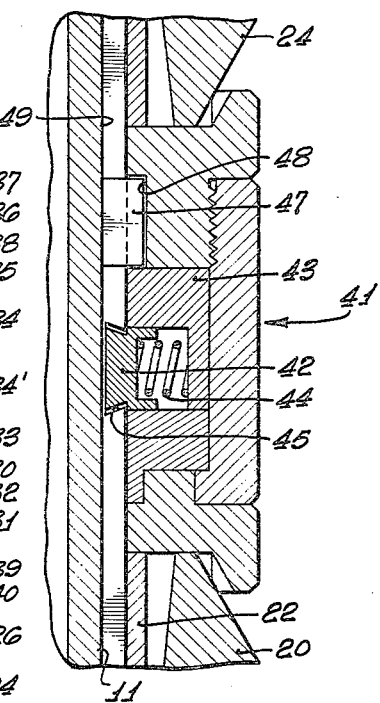
INVENTOR.
HIRAM H. FISHER, JR.
BY
Mellin and Hanscom
ATTORNEYS.

United States Patent Office 3,051,240
Patented Aug. 28, 1962

3,051,240
MULTIPLE TESTING AND PRESSURING
APPARATUS
Hiram H. Fisher, Jr., Houston, Tex., assignor to Baker
Oil Tools, Inc., Los Angeles, Calif., a corporation of
California
Filed Apr. 13, 1959, Ser. No. 806,110
15 Claims. (Cl. 166—131)

The present invention relates to subsurface well apparatus, and more particularly to apparatus capable of performing testing operations in a well bore, and also various types of treatments therein, such as cement squeezing, acidizing and fracturing.

Heretofore, testing equipment has been used to test the productivity of a formation zone, or the effectiveness of a cement job in a well bore. If the particular test indicated the need for subsequent well treatment, the testing equipment was removed from the well bore and other apparatus, such as a well packer, run in the well bore on a tubular string to perform the subsequent treatment, which might be a hydraulic fracturing operation, acidizing of the well, squeeze cementing, or perforating or additional perforating. Following such treatment, the other apparatus was removed from the well bore, and the testing equipment again lowered therein to perform the testing operation. The testing equipment and subsequent treatment equipment was alternately used until the desired satisfactory well condition was realized. It is apparent that the repeated running in and removal of different types of equipment in the well bore is both time consuming and costly.

An object of the present invention is to provide an apparatus which can be run in the well bore and used for alternately testing the well bore and performing a suitable pressuring operation therein without the necessity for removing the apparatus from the well bore.

Another object of the invention is to provide an apparatus adapted to be run in a well bore on a tubular string and of being anchored in packed off condition in the well bore against movement in both upward and downward directions so as to function selectively as a testing tool or a squeeze packer, the passage through the apparatus being selectively blocked, when the apparatus is being used as a tester, or opened fully when the apparatus is being used as a squeeze packer.

A further object of the invention is to provide a retrievable apparatus adapted to be run in a well bore on a tubular string and of being anchored in packed-off condition in the well bore against movement in both upward and downward directions, the apparatus being set in the well bore and released in response to manipulation of the tubular string, and adapted to have a full opening therethrough when the apparatus is in use for forcing fluent materials into the formation, and to have a barrier therein when the apparatus is to be used as a tester, the barrier being inserted in place and removed without the necessity for withdrawing the apparatus from the well bore.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:
FIGURE 1 is a somewhat diagrammatic side elevational view of an apparatus embodying the invention disposed in the well casing, a portion thereof being shown in longitudinal section;

FIGS. 2, 2a and 2b together constitute a longitudinal section through the tester portion of the apparatus, with the valve portion thereof in opened condition, FIG. 2a constituting a lower continuation of FIG. 2 and FIG. 2b constituting a lower continuation of FIG. 2a;

FIGS. 3 and 3a together constitute a longitudinal section through the tester portion of the apparatus with the valve in closed position, FIG. 3a constituting a lower continuation of FIG. 3;

FIG. 4 is a side elevational view of the helical track portion of the valve opening and closing device;

FIGS. 5, 5a and 5b are views corresponding to FIGS. 2, 2a and 2b, respectively, with the retrievable tester mandrel withdrawn to provide a fully open bore through the apparatus;

FIG. 10 is a combined side elevational view and longitudinal section through the retrievable well packer portion of the apparatus shown in FIG. 1, with the slips and packing structure in retracted position;

FIG. 11 is a view similar to FIG. 10 disclosing the packer anchored in packed-off condition against downward movement in the well casing;

FIG. 12 is an enlarged fragmentary longitudinal section through the control unit or clutch portion of the packer disclosed in FIGS. 10 and 11;

FIG. 13 is an enlarged section taken along the line 13—13 on FIG. 10;

FIG. 14 is an enlarged cross section taken along the line 14—14 on FIG. 10;

FIG. 15 is a view similar to FIG. 13 with the control unit in another operative position;

FIG. 16 is a view similar to FIG. 14 with the parts in another relative position.

Figure 6:
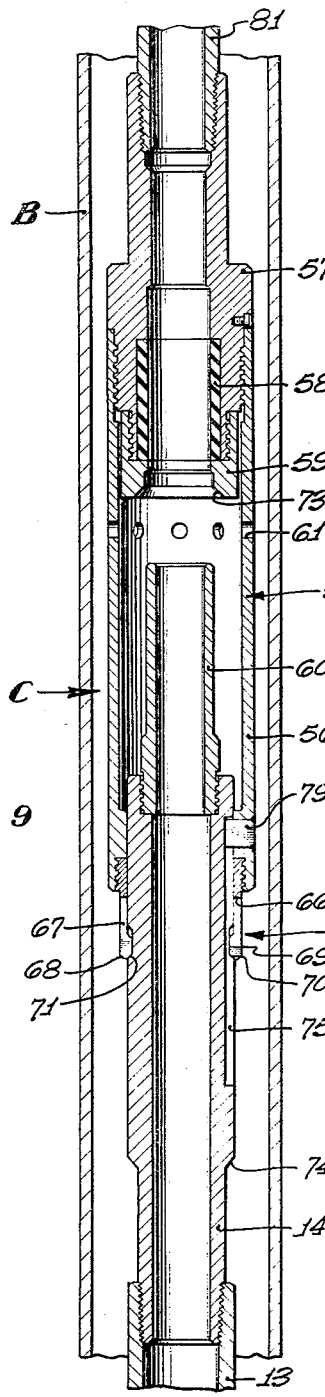
FIG. 6 is a longitudinal section through the equalizer valve portion of the apparatus shown in FIG. 1, the equalizer valve being in opened condition.

The apparatus disclosed in the drawings is adapted to be used in the performance of a test in a well bore and to force fluent materials under pressure into the well bore. As shown, the apparatus includes a lower packer A which is adapted to be anchored in packed-off condition in a well casing B, or other conduit string, against movement in both an upward and a downward direction. The upper end of the well packer is connected to an equalizer valve C which can be opened to provide communication between the interior of the valve and the surrounding annulus D or closed to prevent such communication. The equalizer valve is attached to a tester valve E which can be placed selectively in an open or closed position, and which may embody a pressure recorder F. The tester valve is connected to the lower end of a tubular running-in string G, such as a string of drill pipe or tubing, extending to the top of the well bore and by means of which the well packer A, equalizer valve C and the tester valve E are controlled.

The tester valve E can have its passage 10 blocked to restrict the flow of fluid through the tester valve, as during the performance of a formation test, or the passage may be fully opened so that an unrestricted flow path is provided that continues on through the equalizer valve C and the lower well packer A, to facilitate the pumping of fluent substances downwardly through the entire apparatus, and even to permit the passage therethrough of other equipment, such as casing perforating devices, which may be withdrawn through the apparatus and the tubular string G to the top of the well bore.

The well packer A is of a type that can be anchored in packed-off condition in the well casing B against longitudinal movement in both an upward and downward direction therewithin, to withstand pressures imposed thereon within the well casing from above, as well as pressures imposed thereon from below. Specifically, the well packer is of the type disclosed in the patent to Martin B. Conrad, 2,802,534, and particularly FIGS. 11 and 12 thereof. As shown in FIGS. 10 to 16, inclusive, the well packer A includes an upper body 11 having a body sub 12 attached thereto, by means of which the packer is attached to a tubular connector 13 which is, in turn, threadedly secured to the inner mandrel 14 of the equalizer valve C. A lower expander 15 is secured to the lower end of the body 11 and may have a tail pipe 16 attached thereto which extends downwardly in the well casing B to any desired distance. This lower expander is adapted to coact with a set of lower slips 17, in order to anchor the packer in the well casing against upward movement therewithin. As shown, the lower slips 17 are of the rocker type, and include lower anchor portions 18 having upwardly facing external wickers or teeth 19 adapted to grip the wall of the well casing. The slips also include drag portions 20 adapted to frictionally engage the wall of the well casing B, being urged thereagainst by helical springs 21 engaging the drag portions 20 and a slip retaining assembly 22. When the springs 21 urge the drag portions 20 outwardly into full engagement with the wall of the well casing, the anchor portions 18 are out of engagement with the well casing. When the lower expander 15 moves relatively behind the anchor portions 18 of the slips, the latter are rocked outwardly into anchoring engagement with the wall of the well casing B and are held thereagainst by the lower expander.

The slip supporting assembly 22 also carries a set of upper segmental slips 23 having lower drag portions 24 urged into frictional engagement with the wall of the well casing by helical springs 25 and upper anchor portions 26 having downwardly facing wickers or teeth 27 adapted to engage the wall of the well casing. The upper anchor portions 26 coact with an upper expander 28 slidable on the tubular body 11 of the tool. When this upper expander moves downwardly within the upper slips 23 it rocks the anchor portions 26 outwardly into gripping engagement with the wall of the well casing, the upper slips pivoting on the upper portions of the drag portions 24, as fully described in Patent No. 2,802,534.

The upper expander 28 is secured to the lower end of a thrust or booster sleeve 29 slidable on the body 11, and this thrust or booster sleeve has one or a plurality of packing elements 30, 31 thereon made of rubber or rubber-like material. The lower packing sleeve 31 engages the upper expander 28 and an intervening spacing ring 32, which, in turn, engages the lower end of an upper packing sleeve or ring 30, the upper end of which engages an upper abutment 33 that is slidable on the booster sleeve 29. This booster sleeve has an upper, outwardly extending flange 34' adapted to engage the upper abutment 33, which is prevented from moving longitudinally of the body 11 by being secured to a sleeve-like cage or skeleton structure 34 which is swivelly mounted on the body sub 12. Thus, the cage 34 has a lower shoulder 35 engaging the lower end of the sub 12 and is prevented from moving downwardly of the sub by a cap 36 engaging an upper sub shoulder 37, this cap being secured to the cage in any suitable manner, as by means of one or more screws 38.

The packing sleeves or structure 30, 31 normally occupies a retracted position and is expanded outwardly against the wall of the well casing when the upper abutment 33 moves toward the upper expander 28 (which actually constitutes a lower abutment), which will foreshorten the packing sleeves and effect their expansion into sealing engagement with the wall of the well casing B, as well as with the exterior of the booster sleeve 29. Leakage through the interior of the booster sleeve is prevented by a side seal ring 39 mounted in a groove 40 in the upper expander 28 and slidably sealing against the periphery of the packer body 11.

The upper and lower sets of slips 23, 17 may be locked in a neutral position, in which they are both out of anchoring engagement with the wall of the well casing, by a releasable clutch or control unit 41 adapted to releasably couple the slip mounting structure 22 to the body 11 of the tool. Release of the clutch or control unit will permit the body 11 of the tool and the expanders 15, 28 to move longitudinally with respect to the upper and lower sets of slips, so as to either anchor the lower slips 17 against the well casing or the upper slips 23 against the well casing.

The control unit 41 includes a clutch dog 42 which is movable radially in the clutch housing 43, that forms part of the slip assembly 22, this clutch dog being urged inwardly against the body 11 by a helical compression spring 44. The body has an arcuate groove 45 therein (FIGS. 13 and 15) in which the dog 42 is received, to couple the entire slip assembly 22 to the body 11 of the tool, which will prevent the upper or the lower expanders 28, 15 from expanding the slips into engagement with the well casing. The dog 42 is shifted out of the groove 45 upon rotation of the body 11 of the tool with respect thereto, which will bring a bridge or cam portion 46 of the body opposite the dog 42 and shift it radially outwardly, whereupon the dog will slide along the smooth periphery of the body, which can then move longitudinally in both directions with respect to the surrounding slip assembly 22. The dog 42 is positively located, so as to be able to move into the arcuate clutch groove 45 in the body 11, or is held in a position in which it engages the smooth periphery of the body, by a locating device in the form of a key 47 mounted in a recess 48 in the clutch housing structure and slidable in a longitudinal keyway 49 in the body. Turning of the body 11 in one direction will engage the key 47 with a housing stop 50 at one end of the recess 48 (FIG. 14), which will locate the dog 42 in alignment with the clutch groove 45. Turning of the body in the opposite direction will bring the key 47 into engagement with another housing stop 51 at the other end of the recess 48 (FIG. 16), resulting in the bridge piece 46 shifting under the dog 42 to cam and hold it out of the groove 45.

By turning the body 11 so that the bridge piece 46 is opposite the dog 42, the clutch 41 is released, whereupon the body 11 of the tool is lowered, carrying the cage 34, packing device 29 to 33, and upper expander 28 downwardly with it. The drag portions 20, 24 resist downward movement of the slip assembly 22 and the slips 23, 17 themselves. Accordingly, the upper expander is moved downwardly behind the upper slips 23, engaging their anchor portions 26 and expanding them into anchoring engagement with the well casing B. Further downward movement of the upper expander 28 cannot occur, since they are wedged within the slips 23. As a result, continued downward movement of the body 11 and cage 34 will shift the upper abutment 33 toward the lower abutment or expander 28, expanding the packing sleeves 30, 31 against the well casing B. The well packer is now anchored in packed-off condition in the well casing against downward movement therewithin (FIG. 11).

The well packer A can also be anchored in packed-off condition in the well casing B against upward movement therewithin. After the packer has been anchored in packed-off condition against downward movement in the well casing, such as disclosed in FIG. 11, fluid under pressure can be imparted through the body 11 of the tool and will act on its lower portion, whereupon the body of the tool can be moved upwardly, the fluid pressure carrying the upper expander 28 upwardly away from the upper slips 23, but the packing structure 30, 31 remains sealed against the well casing. This packing structure slides along the well casing until the lower expander 15 moves upwardly behind the lower slips 17 expanding them outwardly into engagement with the well casing B and holding them anchored thereagainst. Pressure can now be imposed through the well packer A, which will be anchored in packed-off condition against upward movement therewithin, since the pressure around the body below the well packer A will urge the upper expander 28 toward the upper abutment 33 to hold the packing structure 30, 31 in sealing engagement against the wall of the well casing.

When the well packer A is released from the well casing, the pressure differential either in the annulus D above the packing structure or the annulus below the packing structure is relieved, and the body 11 of the tool rotated so as to locate its arcuate or circumferential groove 45 in alignment with the clutch dog 42. The body 11 of the tool is then either raised or lowered, as the case may be, to the position in which the dog moves radially into the groove 45, in which position both upper and lower slips 23, 17 are out of wedging engagement with their respective expanders 28, 15 and have been rocked by the springs 25, 21 to bring their anchor portions 26, 18 out of contact with the well casing, the slips then occupying the position illustrated in FIG. 10. The body 11 is then coupled to the entire slip structure 22 and cannot be moved relative thereto for the purpose of expanding the upper or lower slips against the well casing. The entire well packer A can now be moved in either an upward or a downward direction within the well casing B, the packing structure 30, 31 having been returned to its retracted position.

Figure 8:
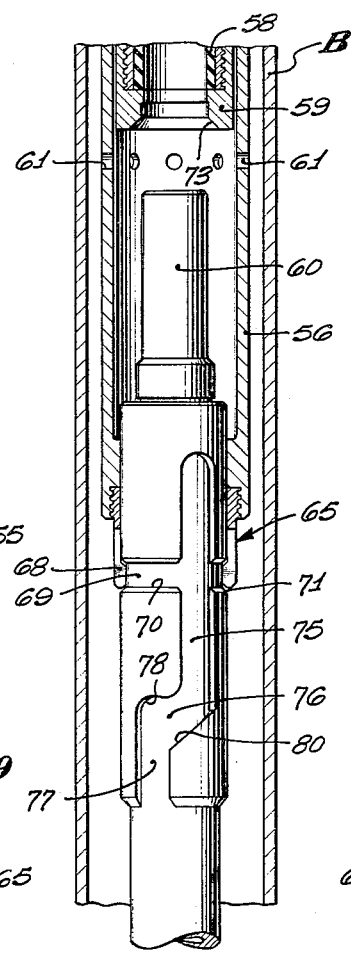
FIG. 8 is a longitudinal section, with a portion shown in side elevation, of the equalizing valve disclosed in FIG. 6.
Figure 7:
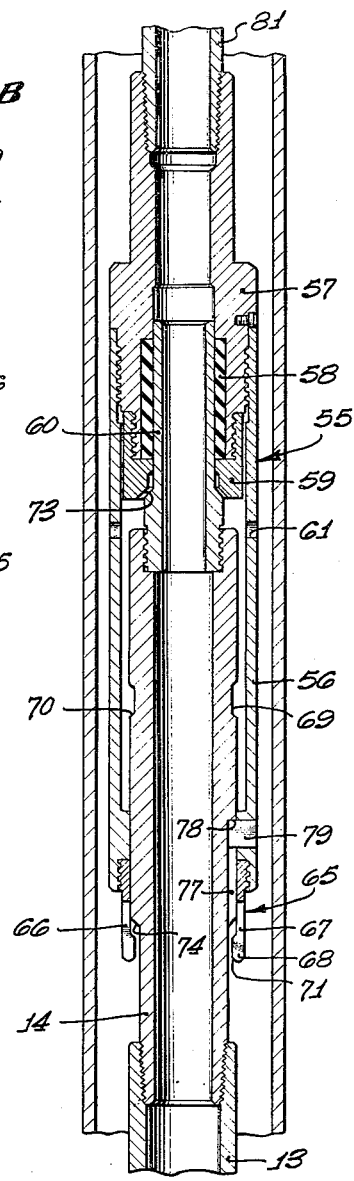
FIG. 7 is a view similar to FIG. 6, with the equalizer valve in closed condition.
Figure 9:
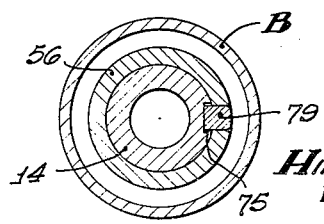
FIG. 9 is a cross-section taken along the line 9—9 on FIG. 6.

As stated above, the well packer A is connected to an equalizer valve C thereabove, which has the purpose of relieving the pressure differential in the annulus D above the well packer when the latter is to be released, and which is closed when a formation test is to be performed or fluid under pressure forced through the apparatus. The tubular connector member 13 secured to the upper body 11 of the packer is attached to the inner mandrel 14 of the equalizer valve, which is telescoped within an outer valve housing 55 which includes a lower housing member 56 threadedly secured to an upper housing member 57. This upper housing member has a suitable seal sleeve and seat 58 held therein by a threaded nut 59 adapted to coact with a tubular valve head 60, threadedly attached to the upper end of the inner mandrel 14, for the purpose of closing side equalizer or circulating ports 61 in the valve housing 55 below the seal sleeve 58. When the valve housing 55 is moved downwardly relative to the mandrel 14, the seal sleeve 58 is disposed over and in sealing engagement with the periphery of the tubular valve head 60, as shown in FIG. 7, in which the ports 61 are closed. On the other hand, upward movement of the housing 55 relative to the inner mandrel 14 will dispose the seal sleeve and seat 58 substantially above the tubular valve head 60, whereupon the circulating ports 61 are opened, as disclosed in FIGS. 6 and 8.

The equalizer valve C is releasably held in its opened or closed conditions and may be releasably locked in its closed condition so as to preclude its being forced to the opened condition in the event that fluid under pressure is being pumped through the apparatus. A latch device is provided between the housing 55 and the mandrel 14. As disclosed, the latch device includes a latch sleeve 65 threadedly attached to the lower end of the housing member 56 and having longitudinal slots 66 therein to provide spring-like legs 67 terminating in feet 68 that are adapted to extend inwardly into a circumferential groove 69 in the periphery of the mandrel 14. The lower side 70 of the groove is tapered so as to coact with the companion upwardly and inwardly tapered surfaces 71 on the feet, in order to cam the latter out of the groove 69. As shown most clearly in FIG. 8, the latch feet 68 are in the circumferential groove 69, which releasably latches the valve C in opened condition. However, when a sufficient downward force is imposed on the housing 55 and the latch sleeve 65, the lower ends 71 of the feet 68 engage the lower tapered side 70 of the groove, which cams the feet out of the groove, whereupon the housing 55 can telescope downwardly over the mandrel 14 until the sleeve valve seal 58 is disposed fully over the tubular valve head 60, as determined by engagement of the nut 59 with a companion shoulder 73 on the valve head. At this time, the feet 68 are disposed below a downwardly facing shoulder 74 on the mandrel 14, the feet having sprung inwardly and being adapted to engage this shoulder to releasably retain the valve in the closed position, such as disclosed in FIG. 7. Upon exertion of sufficient upward force on the housing 55, the lower shoulder 74 will cam or force the legs 67 in an outward direction, allowing the housing to move upwardly relative to the mandrel 14 to again open the valve, the feet 68 then springing into the upper groove 69 and releasably holding the valve in the opened position.

The valve C can be locked in its closed position and cannot be opened regardless of the amount of upward force imposed on the outer housing 55. To accomplish this purpose, the exterior of the mandrel 14 is provided with a longitudinally extending control slot or groove 75 which merges into a diagonal portion 76 which, in turn, opens into a longitudinal locking slot portion 77 that has an upper end 78. The housing has a pin 79 secured thereto extending into the control slot device 75, 76, 77, this pin being movable by the housing 55 in longitudinal slot portion 75 and engaging the lower tapered side 80 thereof, which will steer or move it into the locking slot portion 77. When disposed in the upper longitudinal slot portion 75, the pin does not interfere with the telescopic movement of the housing 55 relative to the mandrel 14, so that the valve parts can be moved between their opened and closed conditions. However, after the housing 55 has been moved downwardly of the mandrel 14 to close the valve, the pin 79 will be disposed in the locking slot portion 77. Accordingly, any tendency to open the valve, as by moving the housing 55 upwardly, will be prevented by the pin 79 shifting into the upper end 78 of the locking slot portion. It is only upon turning of the housing 55, so as to move the pin 79 into alignment with the upper longitudinal slot or groove 75, that a sufficient upward force can be taken on the housing to release the latch dogs 68 from the lower shoulder 74 and shift the housing 55 upwardly of the mandrel 14 back to the valve opening position.

The upper housing member 57 is threadedly attached to a tubular connector member 81 which is, in turn, threadedly attached to the lower end portion 82 of a valve housing 83 adapted to control the upward passage of fluid into the tubular string G when the apparatus is being used for testing purposes. This valve housing 83 includes a lower section 84 threadedly attached to the end housing member 82, this lower section being threadedly attached to a coupling 85 which is, in turn, threadedly attached to an upper housing member 86 releasably coupled to a tubular actuator or drive member 87 mounted therewithin. The outer housing member 86 has a plurality of clutch teeth or clutch pins 88 suitably secured thereto, as by welding material 89, which are adapted to mesh with clutch teeth 90 formed on the tubular actuator 87. The housing clutch teeth 88 and tubular actuator teeth 90 are normally held in mesh with one another, so that the actuator 87 is coupled to the housing 83, by a helical compression spring 91, the upper end of which engages a seat 91a secured to an upper tubular drive portion 92 threadedly attached to the lower tubular actuator or drive portion 87 and the lower end of which bears against a spring seat 93 resting upon an axial thrust bearing 94 which bears against the upper end of the outer housing member 86 and also against a ring 95 welded thereto and extending inwardly to the periphery of the tubular actuator 87. A side seal ring 96 is mounted in the actuator 87 below the clutch teeth 88, 90 for sealing engagement with the wall of the housing 83, and another side seal 97 is provided in the housing ring 95 for sealing engagement against the periphery of the actuator 87 above the clutch teeth. Side ports 98 are provided in the actuator from its inner passage 99 to its exterior between the seal rings 96, 97 so that fluid under pressure within the actuator can act upwardly on the ring portion 95 of the housing 83.

Upon exerting a sufficient downward force on the tubular string G and the actuator 92, 87, the spring 91 is compressed and the actuator 87 is moved downwardly within the outer housing 83 to shift its clutch teeth 90 out of engagement with the housing clutch teeth 88, whereupon the tubular actuator 87 can be rotated for the purpose of engaging and disengaging the tester valve disposed within the housing.

As shown, the tester valve E includes an inner tubular latch housing 100, the lower end of which is threadedly secured to the end housing member 82, the latch housing having a substantially smaller diameter than the outer housing 83 to provide an annular space 101 therebetween. Fluid from the apparatus below the housing 83 can flow upwardly through the well packer A, equalizer valve C and connecter tubing 81 into the lower housing member 82, then passing through longitudinal ports 102 in the latter into the annular space 101, and continuing upwardly therethrough and around a valve seat 103 at the upper end of the latch housing 100, which is provided by a suitable seal ring mounted on the housing by an end nut 104 threaded thereto. A valve sleeve 105 is slidably mounted in the housing and is movable downwardly therewithin to dispose its cylindrical valve head 106 over the seal ring 103 and thereby close the valve, since the fluid is then incapable of passing upwardly from the annulus 101 around the seat 103 and into the valve sleeve 105, which extends upwardly in the housing 83 and is telescopically arranged within the tubular actuator 87, being sealed thereagainst by a suitable seal ring 107 at its upper end engaging the inner wall of the actuator 87. The valve sleeve 105 is slidable axially in the housing 83, but is prevented from rotating therewith by virtue of a key 108 mounted in the connector 85 and extending into a longitudinal keyway 109 in the valve sleeve. Leakage of fluid between the valve sleeve 105 and the housing 83 is prevented by a suitable side seal 110 in the connector 85 sealingly engaging the periphery of the valve sleeve.

The valve sleeve 105 is moved in an upward and a downward direction as a result of rotating the tubular actuator 87 with respect thereto. This tubular actuator has a follower member 111 mounted in a radial hole 112, the follower member being adapted to be received in the upper track portion 113 of the valve sleeve 105, which has intersecting right and left-hand helical grooves 114, 115 in its periphery, receiving the inner end 116 of the follower member, these grooves communicating with one another at their upper and lower ends 117, 118. When the tubular actuator 87 is lowered against the force of the spring 91, to disconnect the clutch teeth 88, 90, it can be rotated, which will cause the follower member 111 to rotate around the sleeve 105. Since the follower 111 is disposed in one of the helical grooves 114 or 115, such rotation will result in an axial seating of the sleeve 105 within the housing to shift its valve head 106 with respect to the companion valve seat 103. When the follower member 111 is moving in the right-hand groove 114, its rotation with the tubular actuator 87 will result in an upward feeding of the valve sleeve 105 within the housing 83, so as to open the valve E. When the follower member reaches the lower end 118 of the right-hand helical groove it will move into the left-hand groove 115, so that continued rotation in the same direction, as to the right, of the tubular actuator or drive member 87 and the follower member 111 will result in a lowering of the valve sleeve 105 and its movement back towards a position of engagement with the companion valve seat 103 to close the valve E.

As shown, a spring-like switch member 120 is disposed at the lower end of the right-hand groove 114 and a spring-like switch member 121 is provided at the upper end of the left-hand groove 115. When the follower member 111 is at the lower end of the right-hand groove 114 it will engage the switch 120 and deflect it to one side, the follower then moving into engagement with a stop shoulder 122 on the valve sleeve 105, which will positively indicate to the operator that the follower has reached the lower limit of its travel in the sleeve 105. A slight reverse turning of the tubular string G and of the tubular actuator 87 and follower member 111 connected thereto will result in the follower engaging the switch 120, which has moved back across the end of the right-hand groove 114, and its turning into a position of alignment with the left-hand groove 115, whereupon right-hand rotation of the actuator 87 and the follower member 111 will cause the latter to ride relatively around the left-hand groove 115 to its upper end, the follower 111 engaging the upper switch 121 and deflecting it to one side, so as to ride past the switch 121 and come into contact with a stop shoulder 123 in the upper end of the sleeve 105, which will advise the operator of such location of the follower, and assure him of the fact that the valve E is again in the closed position. A short backing off or turning to the left of the tubular string G and the actuator 87 and follower 111 will cause it to engage the switch 121 and turn the follower 111 back into a position where it will enter the right-hand groove 114 once again, upon rotation of the actuator and follower in a right-hand direction.

The right and left-hand valve actuating device is essentially disclosed and described generally in the application of Martin B. Conrad and Hiram H. Fisher, Jr., Serial Number 677,607, filed August 12, 1957, to which attention is directed.

In the manner described, the valve sleeve 105 and its valve head 106 can be moved to and from a closed position with respect to the companion valve seat 103, to permit or prevent communication of the annulus 101 between the inner and outer housing members with the interior or passage 10 of the valve sleeve 105. The relative rotation of the actuator 87 and the inner valve sleeve 105 can only occur upon depressing the tubular actuator within the housing 83 to disengage the clutch teeth 90, 88 on the actuator and the housing. When the clutch teeth are engaged, however, the turning effort of the tubular string G and tubular actuator 87 is transferred to the outer housing 83 and from the outer housing to the connector 81, such turning effort proceeding from this connector to the equalizer valve housing 55, and from the pin 79 of the latter to the mandrel 14, the pin engaging the sides of the control and locking slots 75, 77. The torque transmitted to the inner mandrel 14 of the equalizer valve is then transferred through the connector 13 to the body 11 of the well packer, in order to suitably turn such body and control the engaged or disengaged condition of the clutch or control unit 41.

In relatively feeding the valve sleeve 105 and its track portion 113 along the tubular actuator 87, a suitable bumper device 130 cushions the engagement of the follower member 111 at the lower end 118 of the track grooves 114, 115. A similar bumper device 131 is provided to afford a cushioning action when the follower member 111 is at the upper end 117 of the helical grooves or tracks. Thus, a spring seat 132 is secured to the valve sleeve 105 with a helical spring 131 adapted to rest upon this spring seat, the upper end of the spring coming into engagement with the lower end 135 of the tubular actuator 87 when the valve sleeve 105 moves upwardly to the position at which the lower end 118 of the helical grooves receives the follower member 111. During downward shifting of the track member 113 and valve sleeve 105 within the tubular actuator 87, the upper spring and bumper 131 are moved downwardly and the spring seat 132 will engage the upper end of a lower helical bumper spring 130, which rests upon the housing coupling 85, which engagement will occur when the track member is moved downwardly so that the upper ends 117 of the helical grooves receive the follower member or trolley 111.

When the apparatus is to be used as a tester, a removable barrier 150 is provided within the housing member 100, this barrier preventing fluid from passing upwardly through the inner housing member 100. As shown, the barrier includes an elongate main body or mandrel 151 composed of several sections. This body has an upper section 152 providing an upper wedge or expander 153 tapering in an upward and inward direction and adapted to engage a plurality of locking dogs 154 carried for lateral movement on the lower head 155 of an outer mandrel 156 which is slidable on a tubular inner mandrel 157 threadedly attached to the upper body member 152. The locking dogs 154 are adapted to shift outwardly into an inner circumferential groove 158 in the inner latch housing 100, the wedge or expander 153 coacting with the dogs to hold them in the groove, thereby preventing upward removal of the entire body structure or barrier 150 from the latch housing 100 by virtue of the fact that the upper ends of the dogs will engage the upper side 159 of the groove.

The upper housing or body section 152 is threadedly secured to an intermediate housing section 160, there being a suitable sealing structure 161 mounted on the upper housing section and adapted to seal against the inner wall of the latch housing 100, this seal being held on the body 152 by a suitable stop nut 162 threaded on the intermediate housing section and holding the upper end of the seal structure against a shoulder 163 on the upper housing section. The intermediate housing section 160 is threadedly attached to the upper end of another body member 164 which is, in turn, threadedly secured to a lower body member 165 secured to an adapter 166, to the lower end of which the pressure recorder F may be secured, if a pressure recorder is desired. This pressure recorder is smaller in diameter than the inside diameter of the connector tube 81 that surrounds it, so that fluid can pass through the annulus 167 between the recorder and the connector tube, the fluid then flowing through side ports 168 in the adapter to the interior of the latter and through a choke or orifice 169 mounted in the lower body member 165 to the interior of the latter, the fluid then flowing upwardly through ports 170 in the body member 164 into the end housing member 82, the fluid flowing through the passages 102 into the annulus 101 between the inner and outer housing members 100, 83 and then around the valve head 103, continuing on into the valve sleeve 105, when the valve is in the open condition. Leakage of fluid around the body member 164 is prevented by another side seal ring 171 on the body member engaging a companion wall 172 in the end housing member 82.

The barrier structure 150 is properly located in the housing structure after having been lowered down through the tubular string G, by a set of locating keys or dogs 175 mounted in a key holder 176 surrounding the intermediate body member 160 and threadedly secured thereto. These dogs 175 are urged outwardly by springs 177 and are adapted to be received within a selector groove 178 formed in the inner latch housing 100 below the upper locking groove 158. The keys 175 extend outwardly through slots 179 in the holder, their outward movement under the influence of the springs 177 being limited by engagement of the upper and lower ends 180 of the keys with the upper and lower portions 181 of the holder overlying the slots 179.

Each key 175 includes an elongate upper portion 182 adapted to be received in the locator groove 178 of a corresponding length which terminates in an upwardly facing stop shoulder 183 adapted to be engaged by a companion downwardly facing shoulder 184 on the key. The keys have lower tapered guide portions 185 adapted to be received in a lower groove 186, these tapered guide portions guiding the keys and urging them inwardly past coupling spaces and the like in the tubular string G, so that the keys cannot hang up in such coupling spaces. They can only be received in the elongate locating groove 178 in the latch housing 100. When disposed opposite the groove, the keys 175 will extend outwardly therewithin and engage the locating shoulder 183. When so engaged, the locking dogs 154 are disposed opposite the locking groove 158 in the latch housing. Accordingly, any upward pressure tending to shift the barrier structure 150 out of the housing is forestalled, since the upper expander 153 will have moved upwardly behind the dogs to hold them outwardly in the locking groove 158.

In the event that the barrier 150 is to be removed, a suitable retrieving tool (not shown) is lowered through the tubular string G and will be disposed over the outer mandrel 156 and its lower shoulder 190, in a known manner, whereupon an upward pull can be taken on the outer mandrel 156 which will shift the locking dogs 154 upwardly relative to the expander 153, whereupon they can move radially inwardly of the locking groove 158, or to a retracted position. The entire barrier structure 150 can then be moved out of the latch housing 100, since the tapered cam surfaces 191 on the locating keys will merely ride past the upper end of the groove 178 in the latching housing to shift the keys radially inwardly. The entire barrier structure 150, including the pressure recorder F, can then be removed from the apparatus through the tubular string G to the top of the well bore.

The latching and locating portion of the apparatus, by itself, forms no part of the present invention and is illustrated and described in detail in the United States patent to Ira A. Miller, Patent No. 2,673,614.

Assuming that the apparatus is to be used for performing a test in a well bore, the well packer A is latched or clutched in the position in which its slips 17, 23 and packing structure 30, 31 are retracted. This well packer is secured to the equalizing valve C, which is preferably latched in the open position illustrated in FIGS. 7 and 8. The upper end of the equalizer valve is secured to the tester valve E, which has the barrier device 150 latched therewithin, as disclosed in FIGS. 2a, 2b and 3a, the tester valve being closed as a result of the valve sleeve 105 being positioned downwardly so that its head 106 engages its companion seat 103, the valve parts then being in the position illustrated in FIGS. 3 and 3a. Accordingly, the tester valve E is closed, preventing the fluid in the well casing from entering the tubular string G as the apparatus is being lowered in the well casing.

When the location in the well casing is reached at which the apparatus is to be used, the tubular string G is turned, this turning motion being transferred through the actuator or drive member 87 to the housing 83, and from the latter, through the equalizer valve C to the body 11 of the well packer, in order to cause the cam or bridge piece 46 to locate the dog 42 out of the body locking groove 45. The tubular string G is now moved downwardly, the body 11 moving downwardly relative to the slip structure to cause the upper expander 28 to expand the upper slips 23 into anchoring engagement with the well casing, followed by expansion of the packing structure 30, 31 into sealing engagement with the wall of the well casing B. A continuation of the downward effort imposed on the tubular string G and the equalizer valve will cause the latch dogs 68 to be cammed out of the mandrel groove 69, whereupon the equalizer valve housing 55 moves downwardly over the equalizer mandrel 14 to place this valve in the closed position illustrated in FIG. 7.

The apparatus is now in condition to open the tester valve E, since the well packer A is packed off against downward movement in the well casing B, so as to remove the load of the hydrostatic head of fluid above the well packer from the formation or well casing below the well packer. The tubing string G may either be dry, its interior being at atmospheric pressure, or it may have been partially filled with a water cushion, as desired. Since the anchored well packer A and closed equalizer valve C prevent downward movement of the valve housing 83, a sufficient downward force is imposed on the tubular string G to compress the spring 91 and shift the actuator 87 downwardly in the housing to the extent at which the clutch teeth 88, 90 are disengaged. Thereupon, the tubular string is rotated to the right, to rotate the actuator 87 and the follower 111 around the track portion 113 of the valve sleeve 105, effecting an axial upward movement of the valve sleeve to remove its head 106 from the valve seat 103, thereby opening the tester valve. Any formation or other fluid in the well bore below the set packer A will then flow upwardly through the packer and the equalizer valve C, flowing upwardly around the pressure recorder F, which has been recording the pressure conditions in the well bore, passing inwardly through the ports 168 and through the orifice 169 into the mandrel body 151, proceeding outwardly through the body ports 170 into the end housing member 82, then upwardly through the flow passages 102 in the latter into the annulus 101 between the inner and outer housing 100, 83, flowing through this annulus, around the valve seat 103 and into the valve sleeve 105, continuing upwardly through the latter and through the tubular drive member 87 into the tubular string G.

After the tester valve E has been opened for the desired time it can be closed, as by releasing the clutch 88, 90 by downward movement of the actuator 87 within the housing 83 and by rotating the actuator 87, which will then shift the valve sleeve 105 back into a position in which its head 106 is sealed over the companion seat 103. If no further operation is to be performed in the well bore, the tubular string G is elevated to open the equalizer valve C and thereby equalize the pressure on both the upper and lower sides of the well packer A, after which the tubular string G, valve apparatus E and equalizer valve C are turned to relocate the body clutch dog 42 in alignment with the companion body groove 45, the packer body 11 then being moved upwardly until the dog shifts into the locking groove 45, in which position the slips 17, 23 will be retracted, the equalizing of the pressure on both sides of the well packer permitting the packing structure 30, 31 to return inherently to its retracted position. The apparatus can now be removed from the well casing B, if desired, or shifted to another location therewithin.

If, however, the results of the formation or other test indicate that another operation is to be performed with the equipment in the well bore, the apparatus is appropriately conditioned to enable such operation to be performed without the necessity for its removal from the well casing B. All that need be done is to remove the barrier 150 from the housing 100. This is accomplished in any suitable manner, as by lowering a suitable retrieving tool (not shown) down through the tubular string, which will engage and be coupled to the outer mandrel 156, the latter being pulled upwardly to elevate the dogs 154 with respect to the upper expander 153 and enable the dogs to retract from the locking groove 158, whereupon the entire barrier structure, including the pressure recorder F (if used), can be withdrawn through the tubular string G to the top of the hole.

After such withdrawal, and if the valve head 106 has been elevated from its companion seat 103, the actuator 87 and follower member 111 are suitably manipulated to shift the valve head 106 back to closed relation with respect to its seat 103. It will be noted, however, that with the valve head in closed relation to its seat there is still a straight through, open passage through the valve apparatus E and through the equalizer valve C and well packer A therebelow. The well packer A is then suitably manipulated by releasing its clutch dog 42 from the groove 45, and can be anchored in packed off condition against downward movement, as illustrated in FIG. 11. If a fluent material under pressure is then to be forced downwardly through the tubular string G and the apparatus, such as in the performance of a squeeze cementing operation, an acidizing treatment, or a hydraulic fracturing treatment on the formation, the necessary fluent material under pressure is pumped down through the apparatus, the equalizing valve C having first been closed, and the pin 79 disposed in the locking slot structure 77, so that the pressure imposed on the mandrel 14 will not move it downwardly to open the valve. The pressure differential below the well packer A will now produce an elevation of the body 10 of the tool to bring the lower expander 15 under the lower slips 17 and wedge them outwardly into anchoring engagement with the wall of the well casing B, the upper expander 28 being caused by the pressure to follow upwardly with the body 11, the packing sleeves 30, 31 remaining in packed-off condition against the well casing, merely sliding upwardly therealong.

The appropriate pressuring operation can now be performed in the well bore, and after it has been completed it may be desired to test the effectiveness of the operation once again. It is unnecessary to remove the apparatus from the well casing to perform the testing operation. All that need be done is to relower the barrier or plugging equipment 150 through the tubular string G, which will enter the inner housing member 100 and become latched thereto, occupying the position shown in FIG. 3a, the tester valve E being closed. The well packer A is then anchored in packed-off condition against downward movement once again, being disposed in the position disclosed in FIG. 11, and the equalizer valve C closed. The tubular string G can then be swabbed to remove the fluid therewithin, and may be swabbed substantially completely dry, if desired. Thereafter, the tester valve E is again opened by setting down on the tubular string G to release the clutch 88, 90 and rotate the follower 111 around the track portion 113 of the valve sleeve 105. When the tester valve opens, any fluid under pressure in the well bore below the packer A will again flow upwardly therethrough, and through the equalizer valve C, around the pressure recorder F, and through the ports 168 and choke orifice 169 of the barrier into the housing 83, proceeding upwardly around the housing 100 and the valve seat 103 into the valve sleeve 105 for continued upward movement into the tubular string G thereabove.

In the event that the test indicates the need for additional work in the well bore with the equipment, the barrier 150 can again be withdrawn from the latch housing 100 through use of the retrieving tool (not shown); whereupon the well packer A can be set in packed off condition against upward movement in the well casing and additional pressuring operations performed, in the manner described above. If desired, suitable perforating equipment (not shown) can also be lowered through the tubular string G and completely through the apparatus for the purpose of perforating the well casing B below the apparatus, such perforating equipment then being withdrawn.

Subsequent testing operations can be performed, as desired, followed by subsequent treatment in the well bore, all without removing the apparatus from the well casing.

It is only necessary to withdraw the removable barrier 150 or to mount it in place, which can be done very readily by means of a wire line attached to a retrieving tool. The latching barrier is also readily lowered through the tubular string to be latched in place, either by being pumped down through the tubular string G, or by being lowered therewithin by means of a suitable running-in tool (not shown) secured to the inner mandrel 157.

The inventor claims:

1. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; first and second tubular members disposed one within the other and movable with respect to one another; means adapted to secure one of said tubular members to a tubular running-in string; means for securing the other of said tubular members to said tubular body; releasable clutch means engaged for securing said tubular members to each other for rotation together, and releasable to permit their relative rotation; flow control means on said tubular members for determining the flow of fluid through said members and shiftable between opened and closed position in response to manipulation of said one tubular member by the running-in string; and barrier means within and releasable latched to one of said tubular members to prevent flow of fluid through said members when said flow control means is in closed position, said barrier means being adapted for release and removal from said one tubular member and through the tubular running-in string to fully open the passage through said tubular members.

2. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said means; an outer tubular member connected to said tubular body; an inner tubular member within said outer member and adapted to be connected to a tubular running-in string; releasable clutch means for securing said tubular members to each other for rotation together and releasable to permit their relative rotation; a first valve member on said outer member; a second valve member; means operable in response to movement of said inner member for shifting said second valve member from and into engagement with said first valve member to permit or prevent fluid flow in said inner member; and barrier means within and releasably latched to one of said tubular members to prevent flow of fluid through said members when said valve members are in engagement, said barrier means being adapted for release and removal from said one tubular member and through the tubular running-in string to fully open the passage through said tubular members.

3. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; an outer tubular member connected to said tubular body; an inner tubular member within said outer member and adapted to be connected to a tubular running-in string; releasable clutch means for securing said tubular members to each other for rotation together and releasable to permit their relative rotation; a first valve member on said outer member; a second valve member; means operable in response to movement of said inner member for shifting said second valve member from and into engagement with said first valve member to permit or prevent fluid flow in said inner member; and barrier means within and releasably latched to said outer member to prevent flow of fluid through said members when said valve members are in engagement, said barrier means being adapted for release and removal from said outer tubular member through the tubular running-in string to fully open the passage through said tubular members.

4. An apparatus for testing and pressuring a well bore: a well packer adapted to be set in the well bore and having a tubular body; an outer tubular member connected to said tubular body; an inner tubular member within said outer member adapted to be connected to a tubular running-in string; releasable clutch means for securing said tubular members to each other for rotation together and releasable to permit their relative rotation; a first valve member on said outer member; a second valve member; means operable in response to movement of said inner member for shifting said second valve member from and into engagement with said first valve member to permit or prevent fluid flow in said inner member; and barrier means within and releasably latched to one of said tubular members to prevent flow of fluid through said members when said valve members are in engagement, said barrier means being adapted for release and removal from said one tubular member and through the tubular running-in string to fully open the passage through said tubular members.

5. An apparatus for testing and pressuring a well bore: a well packer adapted to be set in the well bore and having a tubular body; an outer tubular member connected to said tubular body; an inner tubular member within said outer member and adapted to be connected to a tubular running-string; releasable clutch means for securing said tubular members to each other for rotation together and releasable to permit their relative rotation; a first valve member on said outer member; a second valve member; means operable in response to movement of said inner member for shifting said second valve member from and into engagement with said first valve member to permit or prevent fluid flow in said inner member; and barrier means within and releasably latched to said outer member to prevent flow of fluid through said members when said valve members are in engagement, said barrier means being adapted for release and removal from said outer tubular member through the tubular running-in string to fully open the passage through said tubular members.

6. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; an outer tubular member connected to said tubular body; an inner tubular member within said outer member and adapted to be connected to a tubular running-in string; releasable clutch means for securing said tubular members to each other for rotation together and releasable to permit their relative rotation; a first valve member on said outer member; a second valve member; means operable in response to rotation of said inner member within said outer member for shifting said second valve member axially from and into engagement with said first valve member to permit or prevent fluid flow in said inner member; and barrier means within and releasably latched to one of said tubular members to prevent flow of fluid through said members when said valve members are in engagement; said barrier means being adapted for release and removal from said one tubular member and through the tubular running-in string to fully open the passage through said tubular members.

7. An apparatus for testing and pressuring a well bore: a well packer adapted to be set in the well bore and having a tubular body; an outer tubular member connected to said tubular body; an inner tubular member within said outer member adapted to be connected to a tubular running-in string; releasable clutch means for securing said tubular members to each other for rotation together and releasable to permit their relative rotation; a first valve member on said outer member; a second valve member; means operable in response to rotation of said inner member within said outer member for shifting said second valve member axially from and into engagement with said first valve member to permit or prevent fluid flow in said inner member; and barrier means within and releasably latched to one of said tubular members to prevent flow of fluid through said members when said valve members are in engagement, said barrier means being adapted for release and removal from said one tubular member through the tubular running-in string to fully open the passage through said tubular members.

8. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; an outer tubular member connected to said tubular body; an inner tubular member within said outer member and adapted to be connected to a tubular running-in string; releasable clutch means for securing said tubular members to each other for rotation together and releasable to permit their relative rotation; a tubular valve member secured within and laterally spaced from said outer member; a valve sleeve adapted to engage said valve member; means operable in response to movement of said inner member for shifting said valve sleeve from and into engagement with said valve member to permit or prevent fluid flow in said inner member; and barrier means within and releasably latched to said tubular valve member to prevent flow of fluid through said valve member and sleeve when said valve member and sleeve are engaged, said barrier means being adapted for release and removal from said tubular valve member and through said tubular string to fully open the passage through said valve member and valve sleeve.

9. In apparatus for testing and pressuring a well bore: a well packer adapted to be set in the well bore and having a tubular body; an outer tubular member connected to said tubular body; an inner tubular member within said outer member and adapted to be connected to a tubular running-in string; releasable clutch means for securing said tubular members to each other for rotation together and releasable to permit relative rotation; a tubular valve member secured within and laterally spaced from said outer member; a valve sleeve adapted to engage said valve member; means operable in response to movement of said inner member for shifting said valve sleeve from and into engagement with said valve member to permit or prevent fluid flow in said inner member; and barrier means within and releasably latched to said tubular valve member to prevent flow of fluid through said valve member and sleeve when said valve member and sleeve are engaged, said barrier means being adapted for release and removal from said tubular valve member and through said tubular string to fully open the passage through said valve member and valve sleeve.

10. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; an outer tubular member connected to said tubular body; an inner tubular member within said outer member and adapted to be connected to a tubular running-in string; releasable clutch means for securing said tubular members to each other for rotation together and releasable to permit their relative rotation; a tubular valve member secured within and laterally spaced from said outer member; a valve sleeve adapted to engage said valve member; means operable in response to rotation of said inner member within said outer member for shifting said valve sleeve axially of said valve member from and into engagement with said valve member to permit or prevent fluid flow in said inner member; and barrier means within and releasably latched to said tubular valve member to prevent flow of fluid through said valve member and sleeve when said valve member and sleeve are engaged, said barrier means being adapted for release and removal from said tubular valve member and through the tubular running-in string to fully open the passage through said valve member and valve sleeve.

11. In apparatus for testing and pressuring a well bore: a well packer adapted to be set in the well bore and having a tubular body; an outer tubular member connected to said tubular body; an inner tubular member within said outer member and adapted to be connected to a tubular running-in string; releasable clutch means for securing said tubular members to each other for rotation together and releasable to permit their relative rotation; a tubular valve member secured within and laterally spaced from said outer member; a valve sleeve adapted to engage said valve member; means operable in response to rotation of said inner member within said outer member for shifting said valve sleeve axially of said valve member from and into engagement with said valve member to permit or prevent fluid flow in said inner member; and barrier means within and releasably latched to said tubular valve member to prevent flow of fluid through said valve member and sleeve when said valve member and sleeve are engaged, said barrier means being adapted for release and removal from said tubular valve member and through the tubular running-in string to fully open the passage through said valve member and valve sleeve.

12. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; first and second tubular members disposed one within the other and movable with respect to one another; means adapted to secure one of said tubular members to a tubular running-in string; means for securing the other of said tubular members to said tubular body; releasable clutch means engaged for securing said tubular members to each other for rotation together, and releasable to permit their relative rotation; helical spring means normally urging said clutch means to engaged position; flow control means on said tubular members for determining the flow of fluid through said members and shiftable between opened and closed positions in response to manipulation of said one tubular member by the running-in string; and barrier means within and releasably latched to one of said tubular members to prevent flow of fluid through said members when said flow control means is in closed position, said barrier means being adapted for release and removal from said one tubular member and through the tubular running-in string to fully open the passage through said tubular members.

13. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; first and second tubular members disposed one within the other and movable with respect to one another; means adapted to secure one of said tubular members to a tubular running-in string; means including an equalizing valve for securing the other of said tubular members to said tubular body, said equalizing valve, when open, enabling the pressure internally and externally of the tubular body to be equalized; means for releasably and positively locking said equalizing valve in closed position; releasable clutch means engaged for securing said tubular members to each other for rotation together, and releasable to permit their relative rotation; flow control means on said tubular members for determining the flow of fluid through said members and shiftable between opened and closed positions in response to manipulation of said one tubular member by the running-in string; and barrier means within and releasably latched to one of said tubular members to prevent flow of fluid through said members when said flow control means is in closed position, said barrier means being adapted for release and removal from said one tubular member and through the tubular running-in string to fully open the passage through said tubular members.

14. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; an outer tubular member; means including an equalizing valve for securing said outer tubular member to said tubular body, said equalizing valve, when open, enabling the pressure internally and externally of the tubular body to be equalized; means for releasably and positively locking said equalizing valve in closed position; an inner tubular member within said outer member adapted to be connected to a tubular running-in string; releasable clutch means for securing said tubular members to each other for rotation together and releasable to permit their relative rotation; a first valve member on said outer member; a second valve member; means operable in response to movement of said inner member for shifting said second valve member from and into engagement with said first valve member to permit or prevent fluid flow in said inner member; and barrier means within and releasably latched to one of said tubular members to prevent flow of fluid through said members when said valve members are in engagement, said barrier means being adapted for release and removal from said one tubular member and through the tubular running-in string to fully open the passage through said tubular members.

15. In apparatus for testing and pressuring a well bore: a well packer having a tubular body, normally retracted anchoring means adapted to be expanded outwardly for securing said body in the well bore against movement in both upward and downward directions, normally retracted packing means on said body adapted to be expanded outwardly into sealing engagement with the well bore, and releasable means operatively connected to said body and anchoring means for latching said anchoring means in retracted position and releasable by manipulation of said body to permit outward expansion of said anchoring means; an outer tubular member; means including an equalizing valve for securing said outer tubular member to said tubular body, said equalizing valve, when open, enabling the pressure internally and externally of the tubular body to be equalized; means for releasably and positively locking said equalizing valve in closed position; an inner tubular member within said outer member adapted to be connected to a tubular running-in string; releasable clutch means for securing said tubular members to each other for rotation together and releasable to permit their relative rotation; a first valve member on said outer member; a second valve member; means operable in response to movement of said inner member for shifting said second valve member from and into engagement with said first valve member to permit or prevent fluid flow in said inner member; and barrier means within and releasably latched to said outer member to prevent flow of fluid through said members when said valve members are in engagement, said barrier means being adapted for release and removal from said outer tubular member through the tubular running-in string to fully open the passage through said tubular members.

References Cited in the file of this patent

UNITED STATES PATENTS

| | | |
|---|---|---|
| 2,337,752 | Johnston | Dec. 28, 1943 |
| 2,657,895 | Huber et al. | Nov. 3, 1953 |
| 2,665,758 | Johnston et al. | Jan. 12, 1954 |
| 2,690,226 | Comstock | Sept. 28, 1954 |
| 2,802,534 | Conrad | Aug. 13, 1957 |
| 2,846,014 | Daffin et al. | Aug. 5, 1958 |